F. W. COVERT.
COUPLING MEMBER FOR HAME FASTENERS AND THE LIKE.
APPLICATION FILED MAR. 14, 1911.
1,149,248.
Patented Aug. 10, 1915.
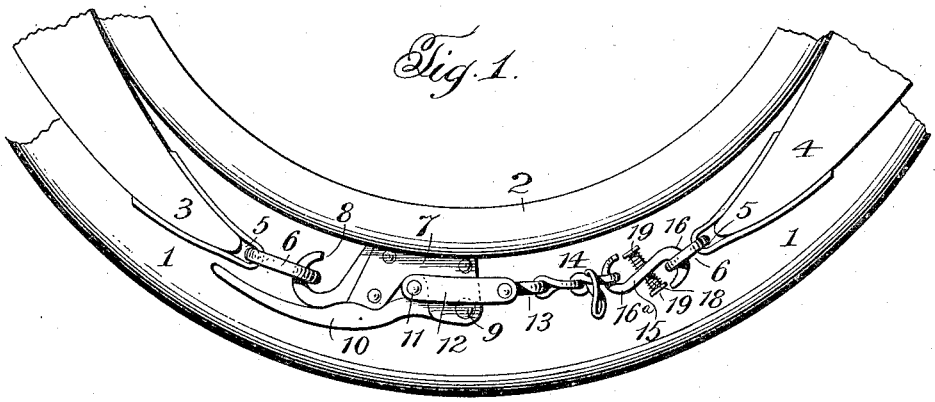
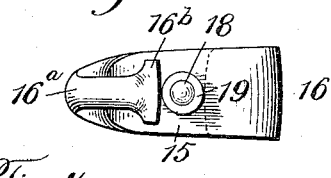
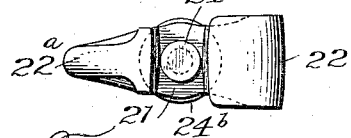
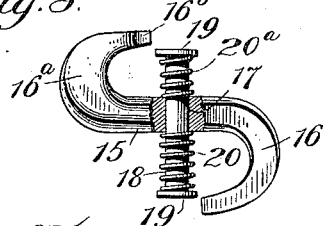
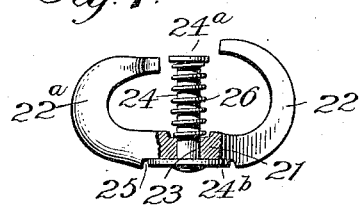
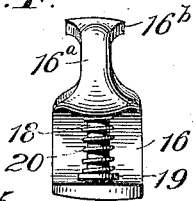
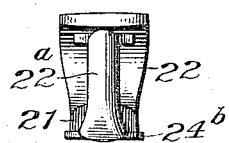
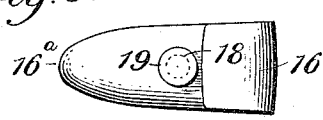
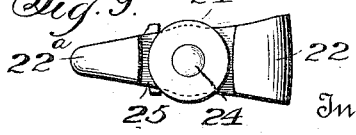
Witnesses:
Jas E Hutchinson
Inventor:
Fred W. Covert,
By ........... Attorneys
COLUMBIA PLANOGRAPH CO., WASHINGTON, D. C.

UNITED STATES PATENT OFFICE.

FRED W. COVERT, OF WATERVLIET, NEW YORK, ASSIGNOR TO COVERT MANUFACTURING COMPANY, OF WATERVLIET, NEW YORK, A CORPORATION OF NEW YORK.

COUPLING MEMBER FOR HAME-FASTENERS AND THE LIKE.

1,149,248. Specification of Letters Patent. Patented Aug. 10, 1915.

Application filed March 14, 1911. Serial No. 614,506.

*To all whom it may concern:*

Be it known that I, FRED W. COVERT, a citizen of the United States, residing at Watervliet, in the county of Albany and State of New York, have invented certain new and useful Improvements in Coupling Members for Hame-Fasteners and the like, of which the following is a specification, reference being had therein to the accompanying drawing.

The present invention relates to certain improvements in hame-fasteners, and has more especial reference to the coupling member for the fastener, that is the means for connecting the usual chain of the fastener to the end of the hame.

It is quite common in the art of hame-fasteners to provide an adjustable connection between the fastener and hame, and to this end it has been customary to employ a chain connected at one end to the fastener and at its opposite end to the hame with associated means whereby the chain length may be varied as desired, and it is to this type of fastener that the present invention has to deal.

The main object of the invention is to provide a coupling between the usual flexible connection or chain and the hame end, which coupling is of novel construction, permitting the same to be more readily applied and removed at will from the hame or chain, or both, and which said coupling while simple and cheap to produce, is rendered more durable and efficient in operation, and is less likely to become accidentally detached and lost.

More particularly, the invention includes a coupling means for the hame fastener made up of a body part having a plurality of hook members, one adapted to engage the chain or flexible connection of the fastener proper, and the other, a part carried by the hame end, and a spring held retaining or locking pin common to both hook members, which, while readily movable to open or close the hook members, is so mounted on the hook as to preclude accidental separation from the parts with which the respective hook members are connected.

Other improvements and novel details in the construction and arrangement of the various parts will be more particularly brought out hereinafter, and for a clear understanding of the invention reference is directed to the accompanying drawings which form a part hereof, and wherein is disclosed for the illustration of the invention, preferred embodiments thereof.

In the drawings: Figure 1 is an elevation of the fastener applied to a collar; Figs. 2 and 5 are plan views of opposite sides of the coupling member; Fig. 3 is a side elevation of the same partly in section; Fig. 4 is an end elevation of the coupling member; Fig. 5 is a plan of the coupling; Figs. 6 and 9 are plan views of opposite sides of a modified form of coupling member; Fig. 7 is a side elevation partly in section, and Fig. 8 an end view of said modified form of coupling.

With more particular reference to the drawings, like reference characters designate corresponding parts throughout the several views, and in Fig. 1 it will be noted that a section of a collar is shown for the purpose of more clearly illustrating the invention, and its application, the said collar having a body portion 1 and a beaded edge 2, thereby forming a groove between the body portion and said beaded edge. This is a common construction of collar. Only portions of the hames themselves are shown, the end of one hame being represented at 3, while the coöperating hame bears the numeral 4. Conveniently the hames have eyes 5 at their ends, and rings or links 6 are preferably mounted on said eyes, the links affording a simple means of connection for the hame fastener proper.

The main or body part of the hame-fastener proper is indicated at 7, the same having connected thereto and projecting from one end thereof, a hook member 8 adapted to engage the link 6 at the end of one of the hames. Pivoted conveniently at 9 to the opposite end of the body part 7 is an operating lever 10, having connected thereto by a pivotal joint 11, a link 12 carrying an auxiliary pivoted link 13 connected to the usual flexible connection, conveniently a chain 14. The means for connecting said chain 14 to the hame link 6 may take various forms, two of which are shown for illustration, and in that form disclosed in Figs. 1 to 5 15 is a body part preferably having substantially flat surfaces and having connected thereto adjacent opposite ends hook members 16 and 16ª. Preferably said parts are formed of an integral casting, but can be mechanically formed and an opening 17 is conveniently stamped in the body part, which said opening is adapted for the reception of what may be termed a locking or retaining pin 18.

The hook members are inwardly curved, and form with the body part a substantially S-shaped structure, and that hook member 16ª which is adapted to engage one of the chain links conveniently has a narrow neck portion connecting with a transversely enlarged head 16ᵇ. Preferably the neck portion referred to is thickened, as shown, whereby to reinforce the same. That hook member 16 to engage the link 6 at one end of the hame may be of substantially the same width as the body part. The retaining pin 18 is of a diameter to loosely play within the opening 17 whereby the pin may be readily moved longitudinally or lengthwise and the same is of a length to extend between points adjacent the terminals of the hook members. The retaining pin 18 also has headed ends 19, which, since the hook ends do not overlie the headed ends of the pin, are free to move beyond the hook members. Conveniently two spring members are employed, one, 20, being sleeved upon the pin to one side of the body part, and the other 20ª being sleeved upon the pin to the opposite side of the body part. Both spring members are adapted to rest against the outer surface of the body part at one end and against the headed ends of the pin at their opposite ends, and it will be observed that, because of the flat surface of the body part adjacent the opening 17, the springs upon being compressed will permit the headed end of the pin upon which the particular spring is mounted, to assume a position a considerable distance below the hook end, whereby to permit the hook to readily engage the part to be connected. Further, the flat surface of the body part leaves an unobstructed space between the hook members and said flat surface, assisting in the ready application of the hook members, as is obvious.

In operation, the operator first applies the hook member 16ª to one of the chain links. This is done by grasping the head at one end of the pin and exerting pulling or drawing action thereon, when the headed end of the pin adjacent the hook member 16ª is forced inwardly thereby leaving a space between the hook end and the body part. The links of the chain are readily insertible sidewise, whereupon they are turned to normal position and the headed end 16ᵇ of the hook member will assist in retaining the applied link in position and prevent undue rubbing contact with the spring 20. To engage the hook member 16 with the link 6 of one of the hame ends, the adjacent headed end of the pin is drawn inwardly by grasping the opposite end thereof and drawing the same outwardly. It will be observed that in operating the pin, one headed end thereof constitutes an operating head piece which is spaced from the body part and adapted to be readily grasped by the operator. This is of advantage since, if the operator were compelled to press inwardly that head end of the pin adjacent the hook member to be applied, the thumb or finger of the operator which would be in engagement with said headed end is very apt to extend over the head of the pin and into the space between the hook and body part, thereby interfering with the ready application of the hook.

Both of the headed ends of the pin lie well within the outer surface of the terminals of the hook members whereby to offer no obstruction therebeyond, which might tend to damage the collar or adjacent parts, and whereby the ends of the hook members constitute protecting mediums, preventing accidental operation of the pin.

In Figs. 6 to 9 of the drawings is shown another embodiment of the invention, which is quite similar to that previously described, and in this modified construction, the body part of the hook member is conveniently indicated by the numeral 21 which latter has connected thereto hook members 22 and 22ª, which may be integral projections of the body part, and which curve inwardly to overlie the same surface of the body part. In this type of construction, the hook member 22 may be shaped to correspond to the hook member of the previously described construction, while the hook member 22ª may take the form of the hook member 16ª of the same construction. The body part has substantially flat surfaces and an opening 23 is conveniently punched or stamped therein. As is obvious the body part and hook members may be formed of an integral casting or may be mechanically formed. A pin 24 is positioned loosely within said opening 23, whereby the same is lengthwise movable, said pin having a head 24ª at one end and a relatively larger head 24ᵇ at its opposite end. The head 24ᵇ is preferably of a diameter to project beyond the sides of the body part and in order that the headed end 24ᵇ will offer no protuberance beyond the outer surface of the body part the latter conveniently has a shallow recess 25 in its outer surface, adapted for the reception of said head. Mounted on the pin 24 is a spring 26 bearing at its opposite ends upon the flat inner surface of the body part and the head 24ª of the pin respectively, the spring tending to force the head 24ᵇ into the recess 25 and the opposite head 24ª into a position adjacent to the terminals of the hook members 22 and 22ª. In this connection the head 24ª of the pin lies within the outer surface of the terminals of the hook members 22 and 22ᵃ so that while it constitutes an effective lock or retaining means for the hook members, the pin or head at the end thereof will offer no projection beyond said outer surface of the hook members.

The operation of this type of coupling is quite similar to that of the previously described coupling, that is to say, the retaining pin is common to both hook members, and in order to move the pin, or the headed end of the pin out of locking position, the operator grasps the head 24ᵇ and draws outwardly, thereby compressing the spring and drawing the head 24ᵃ inwardly. The continuous upper surface of the body part 21 gives considerable space between the body part and the hooks thereby assisting in the ready application of the parts to the hooks, while the flat outer surface of the part 21 may rest flat against the collar or adjacent parts to which the device is applied. Since the enlarged head 24ᵇ projects beyond the sides of the body part, it is readily accessible to be grasped by the operator, the body part offering no hindrance, and the enlargement of the head for this purpose has in effect the same advantages of the previously described construction wherein the headed ends of the pins are spaced from the body part, whereby one of the headed ends is always ready accessible to be operated to withdraw the other headed end of the pin from locking or retaining position.

In the claims, wherein the spring held pin is referred to as longitudinally movable, the term "longitudinally" has reference to a movement in the general direction of the longitudinal axis of the pin, as distinguished from a movement longitudinally of the body portion of the fastener.

What I claim is:

1. In a hame fastener, a coupling comprising a body part having inwardly extending projections at opposite ends, said projections at their terminals which overlie their body part being spaced therefrom so as to form hook receiving recesses, a longitudinally movable spring held locking pin loosely positioned in a transverse opening in the body part and adapted to coöperate with each of said overlying projections to close the recesses formed thereby, one of said projections being relatively flat and widened with respect to the other, and said other projection having a narrow neck and an enlarged head, substantially as and for the purpose described.

2. A coupling member comprising a substantially S-shaped member forming a body part and reversely curved hook members, a longitudinally movable locking pin loosely passing through the body part, said locking pin being of a length to close both openings formed by the hook members, and said locking pin being operable to release one of said hook members while maintaining the other closed, and spring means for holding the locking pin in normal position.

3. In a device of the character described, a relatively wide flat body part connecting at one end with a curved relatively wide hook part and at its opposite end with a relatively narrow curved neck having a transversely extending hook part, and a spring held locking pin loosely passing through an aperture in the body, and common to each hook part.

4. In a device of the kind described, a coupling member adapted to connect a fastener to one end of a hame, said coupling member comprising a substantially S-shaped member forming a body part and reversely curved hook members, a longitudinally movable locking pin passing through the body part and adapted to coöperate with body hook members, and spring retaining means for the pin.

5. In a device of the kind described, a coupling member adapted to connect a fastener to one end of a hame, said coupling member comprising a substantially S-shaped member forming a body part and reversely curved hook members, a longitudinally movable retaining pin adapted to coöperate with both members, and two spring members each mounted upon the pin one to each side of the body part and the pin having projections, one on each side of the body part, whereby said springs will bear against the surface of the body part and the adjacent projections on the pin.

6. In a device of the kind described, a coupling member adapted to connect a fastener to one end of a hame, said coupling member comprising a substantially S-shaped member forming a body part and reversely curved hook members, a longitudinally movable retaining pin adapted to coöperate with both hook members, and two spring members each mounted upon the pin one to each side of the body part and the pin having headed ends whereby each spring will bear against the surface of the body part and the adjacent head of the pin, the heads at the ends of the pin lying within the outer surface of the terminals of the hook members and freely movable past the hook members in the operation of the pin.

In testimony whereof I affix my signature in presence of two witnesses.

FRED W. COVERT.

Witnesses:
  JOHN H. HIRST,
  ELLIS V. B. HORTH.